US012611802B2

(12) United States Patent
Miura et al.

(10) Patent No.: US 12,611,802 B2
(45) Date of Patent: Apr. 28, 2026

(54) METHOD FOR MANUFACTURING A MOLDED ARTICLE OF FIBROIN

(71) Applicant: CANON VIRGINIA, INC., Newport News, VA (US)

(72) Inventors: Jun Miura, Kanagawa (JP); Yu Kameno, Kanagawa (JP); Akira Yane, Tokyo (JP)

(73) Assignee: Canon Virginia, Inc., Newport News, VA (US)

( * ) Notice: Subject to any disclaimer, the term of this patent is extended or adjusted under 35 U.S.C. 154(b) by 0 days.

(21) Appl. No.: 18/518,205

(22) Filed: Nov. 22, 2023

(65) Prior Publication Data

US 2025/0162208 A1     May 22, 2025

(51) Int. Cl.
B29C 43/00         (2006.01)
B29C 43/36         (2006.01)
B29K 101/00        (2006.01)

(52) U.S. Cl.
CPC .......... B29C 43/003 (2013.01); B29C 43/006 (2013.01); *B29C 43/361* (2013.01); *B29K 2101/00* (2013.01); *B29K 2995/0056* (2013.01)

(58) Field of Classification Search
CPC .............. B29C 43/34; B29C 2043/147; B29C 2043/106; B29C 43/02; B29C 43/04; B29C 43/006; B29C 43/003
See application file for complete search history.

(56) References Cited

U.S. PATENT DOCUMENTS

2019/0233481 A1*   8/2019   Morita ................. C07K 14/435

FOREIGN PATENT DOCUMENTS

| JP | 2001-048989 A | 2/2001 |
|----|---------------|--------|
| JP | 2021534277 A | 12/2021 |
| JP | 2022-504694 A | 1/2022 |
| WO | 2015/178147 A1 | 11/2015 |
| WO | 2017/222034 A1 | 12/2017 |
| WO | 2019/054503 A1 | 3/2019 |

* cited by examiner

*Primary Examiner* — Stella K Yi
(74) *Attorney, Agent, or Firm* — Canon U.S.A, Inc., IP Division

(57) ABSTRACT

The present disclosure relates to a method for manufacturing a molded article with improved molding ability of fibroin, wherein the process comprises placing a powder containing a fibroin and a compound having two or more functional groups of a guanidyl group or an amino group and having carbon chains of three to six carbons between the functional groups into a mold, and compressing the powder in the mold with a piston.

7 Claims, 2 Drawing Sheets

S21

Placing the powder into mold

S22

Compressing the powder with a piston while heating

METHOD FOR MANUFACTURING A MOLDED ARTICLE OF FIBROIN

FIELD OF THE DISCLOSURE

The present disclosure relates to a method for manufacturing molded articles.

BACKGROUND

Efforts have been made to process various products using hydrophilic fibroin. Since fibroin is highly hydrophilic and the binding strength between molecules caused by hydrogen bonds is strong, when applying heat or pressure in the molding process, binding between molecules occurs, and the fluidity of the fibroin may decrease, therefore relatively high pressure is required.

US2020/0102424 provides a method for molding in which fibroin is molded at a relatively low pressure by adding additives such as urea to the fibroin to improve the fluidity.

However, when using a large quantity of additives that will remain in the fibroin-molded product, the crystallinity of the molded part decreases causing the flexural modulus to decrease. On the other hand, if the quantity of additives is small, it becomes difficult to achieve both fluidity improvement and suppression of the decrease in flexural modulus, because the effect of fluidity improvement is insufficient.

Therefore, there is a need to improve the fluidity of fibroin at the time of molding while making the crystallinity of the molded part (article) appropriate when obtaining a molded part containing fibroin.

SUMMARY OF THE DISCLOSURE

The present disclosure relates to improving the fluidity of fibroin at the time of molding while making the crystallinity of the molded part appropriate.

Thus, in one aspect, the present disclosure provides a method for manufacturing a molded part which includes placing a powder containing a fibroin and a compound having two or more functional groups of a guanidyl group or an amino group and having carbon chains of three to six carbons between the functional groups into a mold, and compressing the powder in the mold with a piston.

These and other embodiments, objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

The accompanying drawings, which are incorporated herein and form part of the specification, illustrate various embodiments, objects, features, and advantages of the present disclosure.

Figure 1:
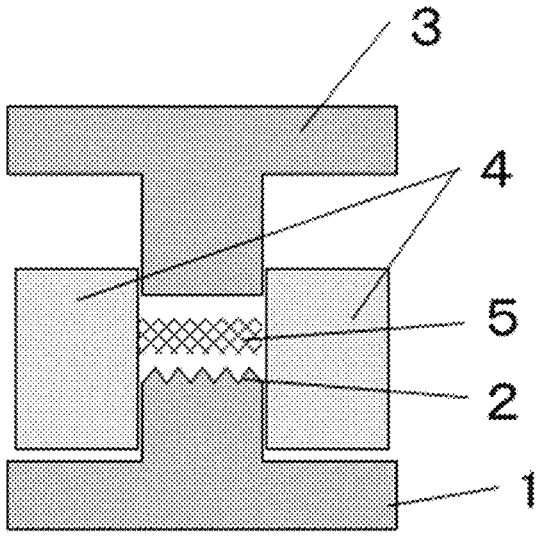
FIG. 1 is a is a schematic cross section of the mold for molding used in the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENT

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

Power for Molding

Figure 2:
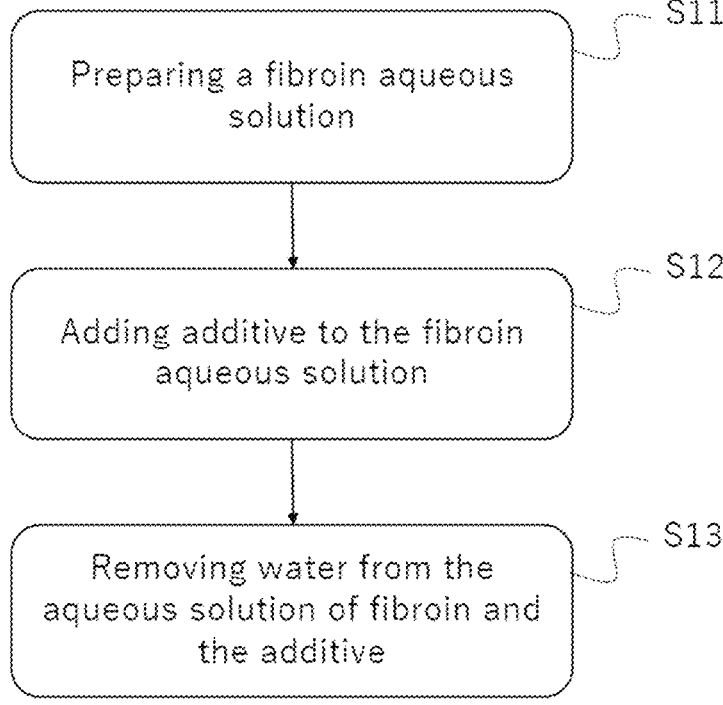
FIG. 2 is a process flowchart depicting a method for obtaining a powder according to the present disclosure.

An exemplary process for obtaining a powder for molding is described in FIG. 2. In step S11, an aqueous fibroin solution is prepared as otherwise described in the present disclosure. In Step S12, an additive is added to the fibroin aqueous solution as described herein. In Step S13, water is removed from the aqueous solution of fibroin and the additive as described herein. The dry sheet forms of the fibroin resulting from Step S13 can then be ground into powder.

The powder for molding of the present disclosure contains a compound (hereafter also referred to as additive) having either two or more functional groups of a guanidyl group or an amino group and having carbon chains between the functional groups consisting of three to six carbons, and fibroin.

The mechanism by which the additives in this disclosure improve the fluidity of fibroin with small quantities can be thought of as follows. The guanidyl group and amino group of the additives of the present disclosure easily interact with the polypeptide sequences that form the fibroin. For this reason, these groups naturally associate at the position where the fibroins hydrogen bond to each other, preventing the fibroins from hydrogen bonding to each other. As a result, the fluidity of the fibroin improves. Furthermore, since the additives of the present disclosure have two or more of either the guanidyl group or the amino group, and the carbon chains between the functional groups consists of three or more carbons, it is possible to improve the fluidity of fibroin due to the steric hindrance effect. In addition, with the number of carbon chains between the functional groups being six or less, the effect of disturbing the hydrogen bonds between the fibroins is not too great, and suppressing the remarkable decrease of the flexural modulus of a molded part is possible.

Arginine or polylysine is can be an additive according to this disclosure. This is because these are industrially accessible, and because of their biocompatibility, which is often required for fibroin-molded parts. These substances can be used solely or in any combination as the additive.

The quantity of additive for improving the fluidity of fibroin is can be 1% by weight or more to 10% by weight or less relative to the powder for molding. At less than 1% by weight, it is difficult to ensure the fluidity of fibroin because the quantity of the additive is small. In addition, when adding a quantity exceeding 10% by weight, the flexural modulus decrease of the molded part becomes large.

Specific examples of methods for verifying the additive content for improving the fluidity of fibroin are described below, but it is not limited to the methods listed and verifying with known methods is possible.

For example, it is possible to consider a method that uses a colorimetric determination kit as a method for verifying the additive content. When the powder for molding has dissolved sufficiently in a LiBr aqueous solution prepared in advance to 1M concentration, detect the concentration in the aqueous solution using a colorimetric determination kit. The actual additive concentration can be determined from the detection sensitivity of the sample, by examining the detection intensity relative to the additive concentration beforehand, and setting it as the standard curve in advance. It is possible to confirm the weight of the dissolved additive that actually improves the fluidity, based on the additive concentration and the quantity of the LiBr aqueous solution used when preparing the aqueous solution. Therefore, it is possible to divide the weight of the powder for molding used, and determine the weight concentration of the additive.

Similarly, there is also a method in which the detection sensitivity of a gas chromatograph or a liquid chromatograph relative to the additive concentration dissolved in a LiBr aqueous solution is checked beforehand to determine the standard curve, and the additive concentration in the solution is calculated based on the detection sensitivity of the sample. The step thereafter can determine the weight concentration of the additive in the same manner as when using a colorimetric determination kit.

There is another method, which uses ultrafiltration. After letting the powder for molding dissolve sufficiently in a pre-concentrated LiBr aqueous solution, perform ultrafiltration to remove the fibroin from the solution and obtain a filtrate consisting of an additive (e.g., arginine), LiBr and water. It is possible to determine the total weight of the arginine in the aqueous solution, because the dry weight of the filtrate minus LiBr is the weight of the arginine. The weight concentration can also be the total weight of arginine relative to the added weight of the powder for molding. When this method is used, the molecular weight cutoff value of the ultrafiltration membrane can be sufficiently small relative to the molecular weight of the fibroin and sufficiently larger than the molecular weight of the additive.

It is possible to use any fibroin without any particular limitation, but silk fibroin purified from silkworm cocoons, hornet silk produced by wasp larvae, and spider silk made from spider thread can be used. The bio-based polymer materials composed of these amino acids have strong hydrophilicity, and can therefore demonstrate the effect of the present disclosure in particular. Of these, one type or a mixture of a plurality of types may be used.

The molecular weight of fibroin can be 30 kDa or more and 300 kDa or less. If it is less than 30 kDa, the mechanical strength of the molded part may decrease, which is not desirable. In addition, if it is larger than 300 kDa, the flow effect due to the additive becomes small because the viscosity of the material itself is too high, which is not desirable.

Method for Manufacturing a Powder for Molding

Figure 3:
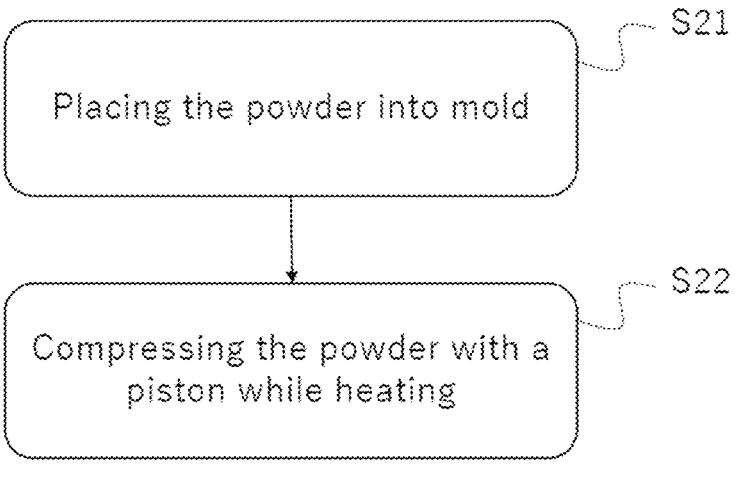
FIG. 3 is a process flowchart depicting a method for molding according to the present disclosure.

In the present disclosure, the powder for molding includes a step for preparing a fibroin aqueous solution, a step for mixing additives into the fibroin aqueous solution, and a step for removing water from the mixed aqueous solution. It may also include a step for processing it as a powder for molding, after removing water. FIG. 3 and the sections below describes each process. In the exemplary method for molding the powder as provided in FIG. 3, in Step S21, the powder prepared as described herein is placed into a mold. In Step S22, the powder is compressed with a piston during heating.

Process for Preparing a Fibroin Aqueous Solution

It is possible to create a fibroin aqueous solution with, for example, the silkworm silk aqueous solution method for manufacturing described in WO 2006/101223 or with the spider silk aqueous solution method for manufacturing described in U.S. Pat. No. 5,245,012. When using these, it is possible to obtain an aqueous solution in which the fibroin has uniformly dissolved.

When the viscosity of the aqueous solution is high, the additive that is mixed in the next process becomes difficult to mix in uniformly, so in one aspect the fibroin concentration in the aqueous solution before adding the additive can be 1 part by weight or more to 30 parts by weight or less. It is possible to determine the weight concentration of fibroin by TGA. Specifically, after heating 20 to 100 mg of a well-agitated fibroin aqueous solution with a temperature-raising rate of 10° C. per minute from 30° C. to 120° C., maintain it at 120° C. for 30 minutes to let the water evaporate. It can then be determined by taking the ratio of the weight after the water has evaporated relative to the weight at the start of the measurement as the weight concentration of the fibroin.

Process for Mixing Additives

Next, mix the additive into the fibroin aqueous solution prepared with the process described above. In this process, both the fibroin and the additive have dissolved in water. Because in the next process, a powder for molding, in which the fibroin and additive are uniformly dispersed, is obtained by removing water from the aqueous solution obtained in this process.

Process for Dewatering

In this process, produce the dry body of the mixture by removing water from the aqueous solution prepared in the previous process. The method to remove water, can use methods such as lyophilizing, spray drying, vacuum drying, vibration drying, drum drying, air-drying, and these can be combined. Among these, lyophilizing, in which the effect of heat on the mixture dissolved in the aqueous solution is small, or spray-drying, in which the solution is heated for a short time, can be used.

When using the lyophilizing method, the freezing temperature is not particularly limited as long as the aqueous solution freezes. However, the freezing point of an aqueous solution, into which solutes (fibroin and additives) have dissolved, is lower than the freezing point of water, so the freezing temperature can be −10° C. or lower, or −20° C. or lower. On the other hand, since dewatering takes longer the lower the drying temperature is, drying can occur at −20° C. or higher, or −15° C. or higher. There is no problem if the pressure is 600 Pa or less, which is the pressure at the triple point of water, in a sample that is sufficiently frozen. However, if part of the sample has liquefied due to temperature unevenness, a pressure of 100 Pa or less can be used, or a pressure of 50 Pa or less can be used, because the aqueous solution will foam. In one aspect, the vacuum can be released when the temperature of the dried material after removing the moisture reaches 10° C. or higher. If it is lower than this, condensation will occur inside the sample and the dry material may absorb water. In this case, the fibroin may gel, which is not desirable.

When using spray drying, the concentration of fibroin in the aqueous solution may be adjusted in advance to facilitate spraying.

Process for Processing as Powder for Molding

It is possible to use a fibroin- and additive-containing composition (fibroin composition) obtained by removing water as is, provided it is itself in powder form. In addition, when the obtained fibroin composition is not in powder form (when it is in bulk form), for example, the powder for molding can be obtained by grinding the dry body after lyophilizing using a jet mill, hammer mill, ball mill, pin mill, etc. In addition, obtaining powder for molding with a fixed uniform particle size is possible by classifying the powder after grinding.

Method for Molding a Powder for Molding

Molding the powder in accordance with the present disclosure can occur below the degradation starting temperature of the fibroin. In addition, to promote the integration of the molded part, the molding time can be selected appropriately so the crystallization rate of the fibroin in the molded body becomes 50% or more.

Although it is possible to use a method for molding without any specification, using general-purpose methods for molding, starting with injection molding, extrusion molding, and compression molding, is possible.

The molding pressure can be 300 MPa or less, or can be 100 MPa or less, which are pressures used in conventional thermoplastic resin molding. A pressure higher than 300 MPa is not desirable because the equipment load becomes greater in proportion to the molded part size and capital investment cost increases. In addition, to perform shape transfer, molding can be performed at 10 MPa or more.

Before the molding process for obtaining the final molding shape, a process that compresses the powder for molding without heating to obtain a powder compact may be provided. By providing this process, complex shapes may also become easier to mold.

Method for Measuring the Crystallization Rate of Molded Parts

For the crystallization rate of a molded part refer to the method described in Nature Materials 19, 102-108 (2020), and determine it with de description below. Specifically, first, the Fourie transform infrared (FTIR) spectrum of the molded part surface is measured every 1 cm−1 in the range from 1580 cm−1 to 1720 cm−1. A linear function passing through the value at 1580 cm−1 and the value at 1720 cm−1 of the obtained spectrum is calculated, set as a baseline, and subtracted from the measurement values. Take the obtained spectrum as the sum of the four spectra, derived from random coils, beta-sheet I, beta-sheet II, and beta-turns, and call it the effective spectrum.

On the other hand, the spectra derived from random coils can be approximated by a variable with peak centers between 1645 cm−1 and 1655 cm−1, and the spectra derived from beta-sheet I, beta-sheet II, and beta-turns can be approximated by the sum of Gaussian functions with peak centers having fixed values of 1620, 1698 and 1685 cm−1, respectively. In the four Gaussian functions, determine the sum of the peak intensity and deviation of the Gaussian function as a variable, and set it as a composite spectrum with nine variables.

In the range of 1580 cm−1 to 1720 cm−1, determine the absolute value of the difference between the effective spectrum and the synthetic spectrum every 1 cm−1, calculate the total sum, and set it as the spectral error. Set the spectral error relative to the integral value of the effective spectrum as the error rate, and fit the nine variables of the synthetic spectrum so that the error rate becomes small. Assume that the spectrum converges when the error rate after fitting is 3% or less, and regard the four spectra constituting the synthetic spectrum as the spectra of each actual component. Finally, calculate the sum of the three spectral integral values derived from beta-sheet I, beta-sheet II, and beta-turns relative to the integral value of the effective spectrum ranging from 1580 cm−1 to 1720 cm−1 as the crystallization rate in the present disclosure. Because the crystallization rate (sum of beta-sheet I, beta-sheet II, and beta-turns) in the case of silk fibroin is considered less than 20% in the dry state before heat molding, and 50% or more after heat molding, it can be judged a molded part having strength, if the rate of crystallization in the present disclosure exceeds 50%.

Fitting can be carried out using the software included with the infrared absorption spectrum measurement device, the graph analysis software, the solver add-ins within Microsoft Excel software, etc.

Method for Evaluation of Shape Transferability

Shape transferability can be evaluated by the Ra (arithmetic mean roughness) of the surface of the molded part, obtained when resin is pressed against a flat mold with a surface roughness Ra of 4 μm and then molded. When the Ra of the surface of the molded part is larger than 3 μm, it can be said that the shape transferability is high, and the fluidity of the fibroin is also high. If the Ra is 3 μm or less, it can be judged that the transfer ratio is low. Note that Ra can be measured by a contact-type measurement method using a tactile needle or a non-contact-type measurement method using a laser or light.

The disclosure is described below using the following Examples.

Example 1

Step 1: Preparing a Fibroin Aqueous Solution

In this step, a fibroin aqueous solution obtained from silk fibroin was prepared.

First, after washing silkworm cocoons with water, they were boiled in a 0.02 mol/L sodium carbonate aqueous solution for 30 minutes, to conduct degumming. The degummed silk was dissolved by pouring it into a 9.3 mol/L LiBr aqueous solution and agitating it at 60° C. for 4 hours. dialysis was performed using 30/32 cellulose tubes (fractional molecular weight of 12000 to 14000) manufactured by Sekisui Chemical Co., Ltd. After further dilution with pure water, it was confirmed that the aqueous solution is homogeneous without precipitate in a visual inspection. This aqueous solution was used as the fibroin aqueous solution. thermal analysis of 73.157 mg of the aqueous solution was conducted using TGA (TGA 8000 manufactured by PerkinElmer Inc.). After heating it from 30 to 120° C. with a temperature-raising rate of 10° C. per minute, and after heating it continuously at 120° C. for 30 minutes, it became 4.511 mg. From this, it was understood that the weight concentration of the fibroin was 6.17%. After that, heating it further to 400° C. with a temperature-raising rate of 1° C. per minute, and upon determining the decomposition starting temperature from the weight loss curve, the decomposition starting temperature was 185° C. In addition, when measuring molecular weight of this fibroin by SDS-PAGE, it was 155 kDa. For the detailed procedure of SDS-PAGE, the procedure disclosed in L. S. Wray et al., J Biomed Mater Res B Appl Biomater. 2011 October; 99 (1): 89-101 was used.

Step 2: Mixing Additives

In this step, arginine was selected as an additive, and a mixture of a fibroin aqueous solution and arginine was prepared. Specifically, it was mixed and agitated so the arginine became 1 part by weight relative to the fibroin, of which the weight concentration was measured in the previous step. One hour after mixing, the liquid mixture was checked visually, but no precipitate was confirmed, and it was homogeneous.

Step 3: Dewatering

In this step, water was removed from the aqueous solution.

After the solution that was mixed with arginine in Step 2 was spread onto separate trays to be 5 mm thick, the trays were placed on shelves in a freeze-dryer (Manufactured by Tokyo Rika Machinery, model number FD-550P) and cooled to –30° C. After 3 hours, after visual confirmation of freezing, decompression started at –6° C. and 30 Pa, and dewatering started. 24 hours later, after letting the sample temperature increase to 15° C., the decompression was released, and the dry bodies in sheet form were taken out.

8

To obtain a sample for evaluating the flexural modulus, an 85 mm×10 mm mold was filled with 4.7 g of the powder, the mold was set in a die compression-molding machine that was preheated to 140° C., and it was heated and compressed to a molding pressure of 100 MPa. After 10 minutes, the load was released and air-cooled, and when the temperature had cooled to 40° C., the mold was disassembled, and the molded part was taken out to evaluate the flexural modulus.

Shape Transferability Evaluation

Upon measuring the surface roughness of the molded part for shape transferability evaluation, the results were listed in Table 1. In addition, cases with a surface roughness of 3.5 μm or more were ranked as A, those of 3.0 or more and less than 3.5 were ranked as B, and those of less than 3.0 were ranked as C, and listed in Table 1.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Ex. 7 |
|---|---|---|---|---|---|---|---|---|---|---|
| Additive Type | Arginine | | | Polylysine | | | Urea | | | Arginine |
| Added amount by Weight | 1 | 5 | 10 | 1 | 5 | 10 | 1 | 10 | 20 | 1 |
| Shape Transferability Ra | 3.1 | 3.3 | 3.5 | 3.3 | 3.4 | 3.7 | 2.1 | 2.5 | 3.2 | 3.0 |
|  | B | B | A | B | B | A | C | C | B | B |
| Bending Strength mPA | 92 | 72 | 52 | 95 | 76 | 59 | 90 | 39 | 11 | 90 |
|  | A | B | B | A | B | B | A | B | C | A |

The two types of sheets remained in the same visual condition after one week of aging, and gelation, etc. did not occur.

Step 4: Obtaining Powder

Powder for molding was obtained by grinding the fibroin composition obtained in Step 3 for 30 seconds in a milling machine (Crush Millser IFM-C20G, manufactured by Iwatani Industries).

Step 5. Molding

The fibroin powders for molding containing additives obtained in Step 4 were molded separately, with one using a mold with a roughened surface to obtain a molded part for evaluating shape transferability, and the other using a mold sized for evaluating the flexural modulus to obtain a molded part for evaluating the flexural modulus.

First, to obtain a sample for evaluating shape transferability, a 1 cm2 lower piston 1 with a roughened surface 2 was prepared. When conducting a non-contact measurement of the surface roughness with a 10×LT objective lens set on an OPTELICS HYBRID+ manufactured by Lasertec Corporation, Ra was 4.0 μm. This lower piston 1 was used as the lower die and a piston guide 4 with a square prism-shaped through-hole of 1 cm2 as shown in FIG. 1 and an upper piston 3 of 1 cm2 without surface roughening were assembled as the upper die. Then a powder for molding compressed body 5, composed of additives and fibroin, was installed into the die.

The die was set in a die compression-molding machine (VN02-2020C, manufactured Mikado Technos Co., Ltd.) in which the press plate had been preheated to 120° C. in advance, and was heated and compressed to a molding pressure of 100 MPa. After 5 minutes, the load was released and air-cooled, and when the temperature had cooled to 40° C., the mold was disassembled, and the molded part was taken out to evaluate shape transferability.

Flexural Modulus Evaluation

The flexural modulus of the molded part for evaluating the flexural modulus was measured, using a universal material tester (Instron Japan Co., Ltd. manufactured 5582) at a pressing speed of 2 mm/min. The results of flexural modulus are listed in Table 1. In addition, cases with a flexural modulus of 90 MPa or more were ranked as A, those of 20 or more and less than 90 MPa were ranked as B, and those of less than 20 MPa were ranked as C, and listed in Table 1.

Examples 2 to 3

In step 2 of Example 1, a process similar to Example 1 was performed, except that an aqueous solution was prepared so the amount of arginine added relative to the fibroin was the additive amount listed in Table 1.

The results of the surface roughness and the flexural modulus of the obtained molded parts are listed in Table 1.

Examples 4 to 6

In step 2 of Example 1, a process similar to Example 1 was performed, except that an aqueous solution was prepared with polylysine as an additive relative to the fibroin as listed in Table 1.

The results of the surface roughness and the flexural modulus of the obtained molded parts are listed in Table 1.

Comparative Examples 1 to 3

In step 2 of Example 1, a process similar to Example 1 was performed, except that an aqueous solution was prepared with urea as an additive relative to the fibroin as listed in Table 1.

The results of the surface roughness and the flexural modulus of the obtained molded parts are listed in Table 1.

Example 7

In this Example, a protein aqueous solution composed of hornet silk was prepared.

In step 1, first, cocoons collected from wasp nests were cut into pieces of approximately 5 mm in size, and to the extent that they could be visually confirmed, impurities were removed. Placing the cocoon fragments in a 9 mol/L LiBr aqueous solution, and agitating them at 40° C. for 1 hour, the cocoon fragments were dissolved. The agitated LiBr aqueous solution was centrifuged, to separate and remove the impurities, which are insoluble components.

Next, the LiBr aqueous solution, from which the impurities were removed, was placed in a 30/32 cellulose tube (fractional molecular weight 12000 to 14000), manufactured by Sekisui Chemical Co., Ltd., and dialysis was performed in distilled water at room temperature for 4 days to remove LiBr. When confirming the obtained protein concentration and the fractional molecular weight, they were 6.51 parts by weight and 45 kDa, respectively.

From step 2 onward, the process was conducted in the same manner as in Example 1, and the results of the surface roughness and the flexural modulus of the obtained molded parts were listed in Table 1.

Crystallization Rate Evaluation

In order to calculate the crystallization rate of the molded body from the infrared absorption spectrum, the infrared absorption spectrum of the surface of the molded part was measured with the ATR method using an FT-IR/NIR spectrometer Frontier manufactured by PerkinElmer Inc. When the crystallization rate of the spectra was determined according to the crystallization rate measuring method, it was confirmed that the crystallization was sufficiently advanced because all the samples in Examples 1 to 7 were above 50%.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. It is expected that skilled artisans can employ such variations as appropriate, and the present disclosure is intended to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for manufacturing a molded article comprising:

placing a powder containing a fibroin and a compound having two or more functional groups of a guanidyl group or an amino group and having carbon chains of three to six carbons between the functional groups into a mold, and compressing the powder in the mold with a piston;

wherein, the amount of the compound in the powder is 1% by weight or more and 10% by weight or less relative to the powder and the presence of the compound in the powder increases the fluidity of the fibroin.

2. The method for manufacturing a molded article according to claim 1, wherein the compressing is performed while heating the powder.

3. The method for manufacturing a molded article according to claim 2, wherein the compressing while heating is performed after compressing the powder in the mold with the piston without heating the powder.

4. The method for manufacturing a molded article according to claim 1, wherein the molded article has a fibroin crystallization rate of 50% or more.

5. The method for manufacturing a molded article according to claim 1, wherein the compressing is performed at a pressure of 30 MPa or more and 300 MPa or less.

6. The method for manufacturing a molded article according to claim 1, wherein the compound contains at least one of arginine or polylysine.

7. A method for manufacturing a molded article comprising:

preparing a powder containing a fibroin and a compound having two or more functional groups of a guanidyl group or an amino group and having carbon chains of three to six carbons between the functional groups by:

obtaining an aqueous solution in which the fibroin is dissolved, wherein the fibroin concentration in the aqueous solution obtained in the obtaining is 2 parts by weight or more and 30 parts by weight or less relative to water;

mixing the compound into the aqueous solution, and removing water as a solvent from the aqueous solution obtained by the mixing;

placing the powder into a mold, and compressing the powder in the mold with a piston.

\* \* \* \* \*